3,398,113
THERMOSETTING RESIN PIGMENT COMPOSI-
TION AND PROCESS THEREFOR
Henry W. Godshalk and René A. Willis, Jr., Holland, Mich., assignors, by mesne assignments, to Chemetron Corporation, Chicago, Ill., a corporation of Delaware
No Drawing. Filed Dec. 1, 1964, Ser. No. 415,203
19 Claims. (Cl. 260—41)

ABSTRACT OF THE DISCLOSURE

A water wet pigment is incorporated into a thermosetting resin without gel formation by the addition of a higher alkyl or higher alkenyl hydroxamic acid having 10–22 carbons to a mixture of the thermosetting resin and the water wet pigment.

---

This invention relates to a method of dispersing pigments in thermosetting acrylic resins, a new class of industrially important resins. It also relates to coating compositions comprising pigments and thermosetting acrylic resins.

The method of dispersing pigments by the flushing process is a well established commercially important means whereby pigments wet with an aqueous phase are transferred to an organic vehicle without the step of drying the pigment. Those skilled in the art are well aware of the advantages of using the flushing process. It is particularly advantageous in the case of pigments which are colloidal, or nearly colloidal, and therefore difficult to filter. It is only necessary that the desired organic vehicle be mixed with the pigment wet with the aqueous phase and the pigment will generally transfer from the aqueous phase to the organic phase. That this process occurs is generally attributed to the preferential wetting action of the organic phase. Obviously the process is not always carried out strictly as outlined above. Many innovations and improvements have been made and are regularly practiced. For example, it is often the practice to employ a flocculating agent when the pigment particles are extremely small. This is done in the interest of efficiency. With respect to the organic phase it is quite common to emulsify the organic vehicle by any of the commonly known means. This increases the interfacial area between the organic and aqueous phases and thereby quickens the transfer process. The flushing process can be carried out usually without difficulty.

However, with the use of thermosetting acrylic resins another problem has arisen which has not been solved by the usual means of solving similar problems. All of the thermosetting acrylic vehicles, when used for flushing inorganic pigments such as ferric hydrate (hydrated iron oxide), and iron blue (Milori blue) yield a product which is a gel. The product in this form is unusable as it will not mix into paint formulations. It would appear that an obvious solution to the problem would be to use a vehicle to flush the ferric hydrate which does not form a gelled product. The thermosetting acrylic resins when used as paint vehicles result in a more durable paint than has heretofore been available. If any other vehicle is used to flush the pigment, then that vehicle dilutes the thermosetting acrylic resin when the flushed pigment is incorporated into the paint formulation and the durability of the paint is consequently reduced. It is particularly desirable, therefore, to use the thermoset acrylic resins in the flushing process.

A more reasonable solution of the gel problem would be the addition of a relatively small amount of an agent to cause the gel to break. By breaking a gel is meant peptizing whereby a change in the physical character of the gel to make it a relatively flowable liquid is effected. Various agents such as amines, amides, esters, etc. have been used as gel breakers as will be seen later in Table I of Example VII. However, when these have been applied to a thermosetting acrylic resin-hydrated iron oxide gel no breaking has resulted.

It has now been discovered that higher alkyl or higher alkenyl hydroxamic acids are effective in breaking the gel. The terms "higher alkyl" and "higher alkenyl" describe alkyl and alkenyl groups having from 10–22 carbon atoms inclusive. Representative of the higher alkyl hydroxamic acids are the capryl, lauryl, myristyl, palmityl, stearyl, arachidyl and behenyl hydroxamic acids. Oleyl, erucyl, linoleyl, linolenyl and clupanodonyl are representative of the higher alkenyl hydroxamic acids.

One needs only add a higher alkyl or higher alkenyl hydroxamic acid and stir it in, mechanical agitation being preferred. It is a matter of experience that when the thermosetting acrylic resin pigment gel is broken so that the viscosity is less than 100 Krebs units (KU) as measured on a Krebs Stormer Viscosimeter, the product will readily blend into paint formulations. The viscosity, then, serves as a measure of the degree of gel breaking. Various batches of the gel require varying amounts of the hydroxamic acid to bring the viscosity into the desired range. It is obviously desirable to use as little of the hydroxamic acid as is necessary to break the gel and generally this can be accomplished by an amount less than 15% of the weight of the pigment-resin gel and preferably an amount in the range of about 1%–15%.

The thermosetting resins referred to in this invention may be regarded as a polymeric backbone of units of acrylic acid, methacrylic acid, esters of those acids, amides of those acids, acrylonitrile, styrene, vinyl acetate, dienes, olefins, vinyl chloride, vinyl ethers, vinyl toluene, drying oils, and the like, or any combination of those units. Appended to the backbone are crosslinking groups such as carboxylic, N-methylol, N-alkoxymethyl carboxamide, hydroxyl, or epoxy groups, or any combination thereof. The thermosetting resins are further characterized by being heat reactive to become highly insoluble in contrast to thermoplastic resins. Crosslinking agents are employed to make the previously described acrylic resins thermosetting. For example, when the resin has crosslinking groups of the carboxylic acid type, epoxides, amino-formaldehyde or phenolformaldehyde resins are employed as crosslinking agents. When hydroxyl groups are the linking groups, diisocyanates and amino-formaldehyde resins are employed. When the crosslinking groups are methylol amide, epoxides and carboxylic acid containing copolymers are used; and when epoxide or glycidyls are the crosslinking groups, then the preferred crosslinking agents are acid catalysts or polycarboxylic acids.

A brief outline will aid in understanding the sequence of steps illustrated in the examples to follow: In Example I a thermosetting acrylic resin emulsion is prepared while in Example II the preparation of ferric hydrate pigment is illustrated. Example III describes the mixing of the resin emulsion and ferric hydrate pigment with a gel breaking hydroxamic acid. Example IV describes the mixing of the resin-pigment dispersion into a standard industrial finish. In Example V another gel breaking compound is described as an alternative to that shown in Example III while in Example VI the preparation of an iron blue-resin dispersion is described. The remaining Example VII is a comparison of the gel breaking properties of oleyl and lauryl hydroxamic acid with other well-known peptizing agents.

The following examples are intended for the purpose of illustrating the present invention. They should not be construed as limiting the invention to the precise reactants, ingredients or conditions specified.

Example I

Into a suitable inert container are placed 2.5 grams of Span 80, which is sorbitan mono-oleate; 22.5 grams of Tween 20, which is polyoxyethylene monolaurate and 696 grams of Polytex 923 which is a thermosetting acrylic resin solution containing 46% solids and made by the Jones-Dabney Company and has the following physical constants:

| | |
|---|---|
| Viscosity (Gardner-Holdt) | M |
| Acid value | 10 |
| Percent non-volatile | 46 |
| Color (Gardner-Holdt) | 2 |
| Lbs.-wt./gallon | 8.00 |
| Red. viscosity at 40% NV in xylol (Gardner-Holdt) | D |

The entire mixture is agitated and into it is poured slowly 1375 grams of water to form an oil in water emulsion for later use in Example III.

Example II

Two solutions are composed as follows:

Solution I.—Add 2165 grams of 20% sodium hydroxide to 12,050 grams of water.

Solution II.—Dissolve 558 grams of anhydrous ferric chloride in 2140 grams of water and allow any extraneous material to settle out.

Add solution II to solution I while stirring the latter vigorously. After the addition of solution II is completed, 320 grams of ferric hydrate is obtained as a colloidal suspension.

Example III

To the 320 grams of ferric hydrate pigment suspension obtained in Example II is added rapidly and with stirring the entire emulsion of Example I. The hydrated iron oxide pigment particles transferring from the aqueous phase to the organic phase. The remaining emulsion is then broken by the addition of approximately 12% hydrochloric acid to bring the emulsion to an approximately neutral pH. The aqueous phase is then removed by filtration, the pigment-resin mixture is put under a vacuum of approximately 17–21 inches of mercury, agitated and maintained between 120–165° F. while thirty, ten gram portions of butanol are added. The butanol azeotropes off the residual water and the butanol additions are made until the water content is below 1% by weight.

Subsequently, Cellosolve acetate, toluene and additional butanol are added to reduce the resin ferric hydrate composition to the following quantities:

| | Grams |
|---|---|
| Ferric hydrate | 320 |
| Resin | 320 |
| Toluene | 635 |
| Butanol | 80 |
| Cellosolve acetate | 165 |
| Total | 1520 |

To the total 1520 grams of ferric hydrate resin gel is added 80 grams of oleyl hydroxamic acid with stirring, resulting in an acrylic resin-ferric hydrate dispersion having a viscosity of about 65 Krebs units.

Example IV

Forty two and one-half grams of the oleyl hydroxamic acid, acrylic resin-ferric hydrate dispersion, as prepared in Example III, is combined with 44.8 grams of additional acrylic resin solution of the type used in Example I. To the resulting solution are added: 15.9 grams of melamine-formaldehyde resin which in this instance is sold under the tradename Clymel resin 245–8 manufactured by American Cyanamid; 1.2 grams of an aluminum paste, which is comprised of 65% by wt. aluminum flakes and the remainder mineral spirits; and 74.0 xylol. The resulting paint is sprayed on a metal panel and baked for 30 minutes at 250° F. to give a gold metallic enamel having a high degree of flash and two-tones.

Example V

The same procedure is followed as outlined in Examples III and IV except that lauryl hydroxamic acid is substituted for oleyl hydroxamic acid to result in a paint having the properties as described in Example IV.

Example VI

A blue pigmented paste composed of iron blue pigment was made from the following ingredients:

| Ingredients: | Grams |
|---|---|
| Iron blue pigment pulp [1] | 500 |
| Polytex 923 (described in Example I) | 1086 |
| Oleyl hydroxamic acid | 125 |
| Toluene | 1000 |
| Cellosolve acetate | 250 |
| Butanol | 125 |
| Total | 3086 |

[1] Standard Milori iron blue pulp containing 80% water.

In preparing the paste, one-third of the iron blue pulp is charged into a Werner Pfleiderer sigma blade type flusher and one-third Polytex 923 resin solution to effect a massing of the pigment and resin after a period of 60 minutes of agitation with a separation of part of the water which can be poured off. The balance of the pulp is added in four portions of one-sixth of the total pulp each followed by a period of agitation of 30 minutes with the addition of more resin as needed and by the application of cooling in the jacket, until all of the pulp has been admixed with resin and a large part of the total pulp water decanted off. The hydroxamic acid in the amount indicated is then added and the mass kneaded while a vacuum of 28 inches is applied to the mixer to remove the remaining water by distillation. Butanol is added as required to maintain the mass in a chunk condition which will remove the water most effectively. When the moisture has been reduced to an optimum level usually in the range of one-half to two percent by wt. calculated on the pigment, resin and solvent mass, then the indicated solvents are added to the kneading mass, adding the butanol first, then the Cellosolve acetate and finally the toluene until the solvents are accumulated in the mass in the amounts indicated. The pigment paste dispersion so obtained is fluid and is incorporated in a coating composition in the manner described in Example IV by substituting it for the ferric hydrate dispersion.

Example VII

The thermosetting acrylic resin-ferric hydrate gel which normally results when such an acrylic resin contains ferric hydrate is unacceptable because it is a gel with a viscosity greater than 150 Krebs units. The effectiveness of hydroxamic acid compounds used as gel breakers is determined by preparing a thermosetting acrylic resin-ferric hydrate gel according to Example III but substituting the gel breaker indicated in Table I. The mixture was then stored two months, stirred for 30 minutes and the viscosity again measured. The results are shown in Table I.

TABLE I

| Gel Breaker | Viscosity, KU | |
|---|---|---|
| | As made up | After 2 mos. storage |
| Methyl diethanolamine | Higher than 150 | Higher than 150. |
| Ethyl aminoethanol | do | Do. |
| Ethomeen C-12[1] | do | Do. |
| 2-methyl pyrrolidine | do | Do. |
| Dimethyl sulfoxide | do | Do. |
| Quaternized dimer diamine | do | Do. |
| N-2-hydroxyethyl acetamide | do | Do. |
| Hydroxylamine 0-sulfonic acid | do | Do. |
| Quinoline | do | Do. |
| Lauryl hydroxamic acid | 65. | |
| Oleyl hydroxamic acid | 65. | 65. |

[1] Ethomeen C-12 is a condensation product of ethylene oxide and primary amines derived from coconut fatty acids. This quaternized dimer diamine has the general structure

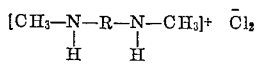

where R is a hydrocarbon radical having 36 carbon atoms.

In the preceding examples a certain thermosetting acrylic resin is employed in conjunction with oleyl and lauryl hydroxamic acids. It should be understood that all of the higher alkyl and higher alkenyl hydroxamic acids as described herein are operable in breaking down a gel product which forms between any thermosetting acrylic resin and a pigment which tends to form a gel with the resin when a pigment-resin dispersion is attempted to be formed. While it is not definitely known, it is believed that gel formation is caused by the ionic attraction of the reactive groups of the thermosetting resin with the bonding groups of the pigment while in the wet phase. The use of the described hydroxamic acids to break the gel is therefore not restricted to any one particular thermoset acrylic resin. Neither is the gel breaking properties of the described hydroxamic acids limited to ferric hydrate and Milori iron blue acrylic resin dispersions. Gel formation caused by any pigment having bonding groups or surface attraction with an acrylic resin can be peptized by the described hydroxamic acids. Representative of such pigments are the phthalocyanines, quinacriadones, vat blues and the carbazole dioxazine pigments. While Milori blue has been exemplified as a preferred iron blue it should be understood that any of the iron blues, prepared by the precipitation of ferrous ferrocyanide from a soluble ferrocyanide and ferrous sulfate with subsequent oxidation which cause gel formation with an acrylic resin can be peptized by the present novel process. Other iron blues made in the indicated manner are the well known Bronze, Chinese and Prussian blues.

The higher alkyl or higher alkenyl hydroxamic acid-acrylic resin dispersions are compatable in any standard industrial finish. No special precautions or equipment need be taken in blending the hydroxamic acid, acrylic resin-pigment dispersion with the finished industrial paint. Neither must any precautions be taken in combining the described hydroxamic acids when the pigment is flushed into the thermosetting resin. The described hydroxamic acids while preferably added at the start of the vacuum phase for removal of pulp water, can also be used in any part of the flushing process to improve viscosity.

Certain additives such as Span 80 and Tween 20 have been employed for the purpose of emulsifying the resin solution in water. It should be understood that these additives are not essential but merely aid in preparing the emulsion. Other surface active additives can also be employed or alternatively they can be eliminated with no effect on the peptizing action of the higher alkyl or higher alkenyl hydroxamic acids.

As indicated in the examples, the resultant peptized ferric hydrate dispersion is effective with a polychromatic coating. While aluminum is described for use as the second pigment it should be understood that other well known pigment toners can be employed in addition to the ferric hydrate and aluminum pigments. Alternatively, the ferric hydrate and aluminum paste composition of Example IV can itself be used as a toner. Bronze powder, pearl essence, and other toning pigments are also effectively employed in formulating acrylic paints containing hydroxamic acid for degellation purposes. Further, while the dispersed degelled pigments have been shown for use with a multi-pigment system it should be understood that the described hydroxamic acids are equally as useful when the dispersions are employed to compose a paint containing only one pigment.

It will thus be seen from the foregoing that there is now provided a novel method for preparing a thermosetting acrylic resin-pigment dispersion which previously could not be incorporated into a paint formulation because of the gelatinous consistency of the acrylic resin-pigment dispersion. The present process results in an acrylic resin-pigment dispersion which when incorporated into a finished paint formulation has upon drying superior gloss and transparency than any finish now commercially available. The present process is economical to employ as no special equipment is required and is operative with any of the standard thermosetting acrylic resins and paint formulations now in industrial use.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:
1. A process for preparing a thermosetting resin pigment dispersion from a pigment wet wtih an aqueous phase comprising combining a thermosetting resin having reactive groups and being heat reactive to become highly insoluble in contrast to thermoplastic resins, a wet pigment having bonding groups or surface attraction with said resin tending to form a gel when mixed with said resin and a gel breaking compound selected from a group consisting of higher alkyl and higher alkenyl hydroxamic acids having 10–22 carbon atoms, said gel breaking compound being combined in an amount to break said gel tending to form between said pigment and said resin to the extent that said resin and said pigment adequately blend with other materials and not exceeding about 15% by weight based on the combined weight of said resin and said pigment.

2. The process as defined in claim 1 wherein the amount of said gel breaking compound is in the range of about 1% to about 15% by weight based on the combined weight of said resin and said pigment.

3. A process for preparing a thermosetting resin pigment dispersion from a pigment wet with an aqueous phase comprising combining a thermosetting resin having reactive groups and being heat reactive to become highly insoluble in contrast to thermoplastic resins, a wet pigment having bonding groups or surface attraction with said resin tending to form a gel when mixed with said resin and a higher alkyl hydroxamic acid gel breaking compound having 10–22 carbon atoms and being combined in an amount to break said gel tending to form between said pigment and said resin to the extent that said resin and said pigment adequately blend with other materials and not exceeding about 15% by weight based on the combined weight of said resin and said pigment.

4. A process for preparing a thermosetting resin pigment dispersion from a pigment wet with an aqueous phase comprising combining a thermosetting resin having reactive groups and being heat reactive to become highly insoluble in contrast to thermoplastic resins, a wet pigment having bonding groups or surface attraction with said resin tending to form a gel when mixed with said resin and a higher alkenyl hydroxamic acid gel breaking compound having 10–22 carbon atoms being combined in an amount to break said gel tending to form between said pigment and said resin to the extent that said resin and said pigment adequately blend with other materials and not exceeding about 15% by weight based on the combined weight of said resin and said pigment.

5. A process for preparing a thermosetting acrylic resin pigment dispersion from a pigment wet with an aqueous phase comprising combining a thermosetting acrylic resin having reactive groups and being heat reactive to become highly insoluble in contrast to thermoplastic resins, a wet pigment having bonding groups or surface attraction with said resin tending to form a gel when mixed with said resin and oleyl hydroxamic acid combined in an amount to break said gel tending to form between said pigment and said resin to the extent that said resin and said pigment adequately blend with other materials and not exceeding about 15% by weight based on the combined weight of said resin and said pigment.

6. A process as defined in claim 5 wherein said oleyl hydroxamic acid is present in the range of about 1% to about 15% by weight based on the combined weight of said resin and said pigment.

7. A process for preparing a thermosetting acrylic resin pigment dispersion from a pigment wet with an aqueous phase comprising combining a thermosetting acrylic resin having reactive groups and being heat reactive to become highly insoluble in contrast to thermoplastic resins, a wet pigment having bonding groups or surface attraction with said resin tending to form a gel when mixed with said resin and lauryl hydroxamic acid combined in an amount to break said gel tending to form between said pigment and said resin to the extent that said resin and said pigment adequately blend with other materials and not exceeding about 15% by weight based on the combined weight of said resin and said pigment.

8. The process defined in claim 7 wherein said lauryl hydroxamic acid is present in the range of about 1% to about 15% by weight based on the combined weight of said resin and said pigment.

9. A process for preparing a thermosetting acrylic resin pigment dispersion from a ferric hydrate pigment wet with an aqueous phase comprising combining a thermosetting acrylic resin having reactive groups and being heat reactive to become highly insoluble in contrast to thermoplastic resins, a water wet ferric hydrate pigment and oleyl hydroxamic acid combined in an amount to break said gel tending to form between said pigment and said resin to the extent that said resin and said pigment adequately blend with other materials and not exceeding about 15% by weight based on the combined weight of said resin and said pigment.

10. A process for preparing a thermosetting acrylic resin pigment dispersion from a ferric hydrate pigment wet with an aqueous phase comprising combining a thermosetting acrylic resin having reactive groups and being heat reactive to become highly insoluble in contrast to thermoplastic resins, a water wet ferric hydrate pigment and lauryl hydroxamic acid combined in an amount to break said gel tending to form between said pigment and said resin to the extent that said resin and said pigment adequately blend with other materials and not exceeding about 15% by weight based on the combined weight of said resin and said pigment.

11. A process for preparing a thermosetting acrylic resin pigment dispersion from an iron blue-type pigment wet with an aqueous phase comprising combining a thermosetting acrylic resin having reactive groups and being heat reactive to become highly insoluble in contrast to thermoplastic resins, a water wet iron blue-type pigment and oleyl hydroxamic acid combined in an amount to break said gel tending to form between said pigment and said resin to the extent that said resin and said pigment adequately blend with other materials and not exceeding about 15% by weight based on the combined weight of said resin and said pigment.

12. A thermosetting resin pigment composition comprising a thermosetting resin having reactive groups and being heat reactive to become highly insoluble in contrast to thermoplastic resins, a pigment having bonding groups or surface attraction with said resin tending to form a gel when mixed with said resin and a gel breaking compound selected from a group consisting of higher alkyl and higher alkenyl hydroxamic acids having 10–22 carbon atoms, said gel breaking compound being combined in an amount to break said gel tending to form between said pigment and said resin to the extent that said resin and said pigment adequately blend with other materials and not exceeding about 15% by weight based on the combined weight of said resin and said pigment.

13. The composition of claim 12 wherein the amount of said gel breaking compound is present in the range of about 1% to about 15% by weight based on the combined weight of said resin and said pigment.

14. A thermosetting resin pigment composition comprising a thermosetting resin having reactive groups and being heat reactive to become highly insoluble in contrast to thermoplastic resins, a pigment having bonding groups or surface attraction with said resin tending to form a gel when mixed with said resin and a higher alkyl hydroxamic acid gel breaking compound having 10–22 carbon atoms being combined in an amount to break said gel tending to form between said pigment and said resin to the extent that said resin and said pigment adequately blend with other materials and not exceeding about 15% by weight based on the combined weight of said resin and said pigment.

15. A thermosetting resin pigment composition comprising a thermosetting resin having reactive groups and being heat reactive to become highly insoluble in contrast to thermoplastic resins, a pigment having bonding groups or surface attraction with said resin tending to form a gel when mixed with said resin and a higher alkenyl hydroxamic acid gel breaking compound having 10–22 carbon atoms being combined in an amount to break said gel tending to form between said pigment and said resin to the extent that said resin and said pigment adequately blend with other materials and not exceeding about 15% by weight based on the combined weight of said resin and said pigment.

16. A thermosetting acrylic resin pigment composition comprising a thermosetting acrylic resin having reactive groups and being heat reactive to become highly insoluble in contrast to thermoplastic resins, a pigment having bonding groups or surface attraction with said resin tending to form a gel when mixed with said resin and oleyl hydroxamic acid combined in an amount to break said gel tending to form between said pigment and said resin to the extent that said resin and said pigment adequately blend with other materials and not exceeding about 15% by weight based on the combined weight of said resin and said pigment.

17. The product of claim 16 wherein said oleyl hydroxamic acid is present in the range of about 1% to about 15% by weight based on the combined weight of said resin and said pigment.

18. A polychromatic coating composition comprising a thermosetting acrylic resin having reactive groups and being heat reactive to become highly insoluble in contrast to thermoplastic resins, at least two pigments having bonding groups or surface attraction with said resin tending to form a gel when mixed with said resin, a gel breaking compound selected from the group consisting of higher alkyl and higher alkenyl hydroxamic acids having 10–22 carbon atoms, said gel breaking compound being combined in an amount to break said gel tending to form between said pigments and said resin to the extent that said resin and said pigments adequately blend with other materials and not exceeding about 15% by weight based on the combined weight of said resin and said pigment and a cross linking agent for said resin.

19. The product as defined in claim 18 wherein said gel breaking compound is present in the range of about 1% to about 15% by weight based on the combined weight of said resin and said pigment.

References Cited

UNITED STATES PATENTS 2,282,527  5/1942  Morrison et al. _____ 106—262
3,105,826  10/1963  Jaggard _____ 260—41

ALLAN LIEBERMAN, *Primary Examiner.*